(12) United States Patent
Martin et al.

(10) Patent No.: US 7,302,961 B2
(45) Date of Patent: Dec. 4, 2007

(54) SURGE RELIEF VALVE

(75) Inventors: Jeffrey R. Martin, Orchard Park, NY (US); John W. Ostroot, Williamsville, NY (US)

(73) Assignee: Flow-Safe, Inc., Orchard Park, NY (US)

( * ) Notice: Subject to any disclaimer, the term of this patent is extended or adjusted under 35 U.S.C. 154(b) by 139 days.

(21) Appl. No.: 10/711,207

(22) Filed: Sep. 1, 2004

(65) Prior Publication Data

US 2006/0042696 A1    Mar. 2, 2006

(51) Int. Cl.
*F16K 17/02* (2006.01)
*G05D 16/10* (2006.01)

(52) U.S. Cl. .................. 137/14; 137/514; 137/529; 137/488; 137/494; 251/64; 277/916; 277/946

(58) Field of Classification Search ............. 137/528, 137/529, 488, 489, 494, 514–514.7, 906; 251/64; 277/916, 946
See application file for complete search history.

(56) References Cited

U.S. PATENT DOCUMENTS

| | | | | |
|---|---|---|---|---|
| 2,574,414 A | * | 11/1951 | Ragland | 137/492 |
| 3,107,688 A | * | 10/1963 | Caslow | 137/494 |
| 3,714,953 A | * | 2/1973 | Solvang | 137/14 |
| 3,913,885 A | * | 10/1975 | Greenwood et al. | 251/63 |
| 3,917,290 A | * | 11/1975 | Geoffroy | 277/448 |
| 3,933,172 A | * | 1/1976 | Allen | 137/494 |
| 4,580,790 A | * | 4/1986 | Doose | 524/546 |
| 4,848,397 A | | 7/1989 | Bickford | |
| 5,016,665 A | * | 5/1991 | Konieczynski | 137/1 |
| 5,174,326 A | * | 12/1992 | Steinert et al. | 137/468 |
| 5,842,501 A | | 12/1998 | Powell | |
| 6,220,280 B1 | * | 4/2001 | Lai | 137/488 |
| 6,428,014 B2 | * | 8/2002 | Scarlett | 277/435 |
| 6,978,799 B2 | * | 12/2005 | Kugelev et al. | 137/514.7 |

* cited by examiner

*Primary Examiner*—Ramesh Krishnamurthy
(74) *Attorney, Agent, or Firm*—Simpson & Simpson, PLLC (57) ABSTRACT

A surge relief valve comprising a main valve body having a dome port and an inlet port. The inlet port is in fluid communication with a first fluid. The invention further includes a dome reservoir connected to the main valve body via the dome port and arranged to hold a second fluid, a piston located in the main valve body, the piston in fluid communication with the reservoir, and a dampening ring positioned around the circumference of the piston operatively arranged to dampen the piston, wherein the first fluid exerts an upward force on the piston, the second fluid exerts a downward force on the piston, and the piston is arranged to move in response to a differential in the upward and downward forces, wherein the first and second fluids are isolated from one another.

27 Claims, 6 Drawing Sheets

SURGE RELIEF VALVE

FIELD OF THE INVENTION

This invention relates to a surge relief valve in a safety relief system for a pressure vessel, more particularly to an improved surge relief valve for use in liquid product pipelines, and, even more particularly, to a surge relief valve having a dome gas-filled reservoir arranged to bias the main valve closed until a set relief pressure is sensed, and then to open to relieve the overpressure, and finally to force the main valve to close when the overpressure has dissipated. The present invention is an improvement over the invention disclosed and claimed in U.S. Pat. No. 5,842,501, issued Dec. 1, 1998, and incorporated herein by reference.

BACKGROUND OF THE INVENTION

Heretofore, pilot operated safety relief valves have been provided in pressure relief systems. Examples of prior art pilot operated relief valves are disclosed in U.S. Pat. No. 4,848,397 dated Jul. 18, 1989, and U.S. Pat. No. 5,842,501, dated Dec. 1, 1998. While these types of relief valves have proven effective in applications where the fluid product is a gas, they are not suitable for use in some liquid applications, e.g., oil supply lines.

Liquid product pipelines must be protected from liquid surge, typically caused by pump failure, rapid block valve closing, non-return check valve hard shutting, emergency shut down of a tank or loading system, or even a pump coming on or tripping. The magnitude of surge pressures vary—some are virtually undetectable, while others are severe enough to cause major damage. These propagating waves, either increasing or decreasing rapidly, are commonly known as hydraulic transient surges or water hammers that can cause severe damage to liquid product pipelines, vessels, flanges, valving, and associated equipment. Pilot operated safety relief valves don't operate quickly enough to open and relieve the pressure.

What is needed, then, is a surge relief valve in a pressure relief system for a pressure vessel, more particularly an improved surge relief valve for use in liquid product pipelines, and, even more particularly, a surge relief valve having a dome gas-filled reservoir arranged to bias the main valve closed until a set relief pressure is sensed, and then to open to relieve the overpressure, and finally to force the main valve to close when the overpressure has dissipated.

SUMMARY OF THE INVENTION

The present invention broadly comprises a surge relief valve comprising a main valve body having a dome port and an inlet port. The inlet port is in fluid communication with a first fluid. The invention further includes a dome reservoir connected to the main valve body via the dome port and arranged to hold a second fluid, a piston located in the main valve body, the piston in fluid communication with the reservoir, and a dampening ring operatively arranged to dampen the piston, wherein the first fluid exerts an upward force on the piston, the second fluid exerts a downward force on the piston, and the piston is arranged to move in response to a differential in the upward and downward forces, wherein the first and second fluids are isolated from one another.

It is a general object of this invention to provide a surge relief valve assembly for rapid relief of excess pressure in liquid systems, whereby main valve set pressure and closing pressure are established solely by a fixed pressure of a suitable gas present in the dome region of the main valve, and whereby system relief can commence at the instant that system fluid pressure acting on the main seat area results in a force on the main piston greater than the opposing force exerted by dome gas pressure at the top of the piston.

Another object of this invention is to provide a surge relief valve assembly with a dome gas reservoir permanently attached to the top cover plate (cap), whereby existing dome gas present when the main valve first starts to open can further be compressed in a controlled manner as the main valve piston opens, so as to regulate the piston stroke and ultimately force closed the piston when the process liquid overpressure condition abates.

It is a further object of this invention to provide a surge relief valve that uses a main valve body in which the inlet passage is axially aligned with the main closure member (piston and seat), and where the outlet passage is aligned at ninety degrees to the inlet passage.

A further object of the invention is to dampen main valve piston movements, particularly upon closing, and eliminate or reduce the incidence of piston oscillations within the surge relief valve through the use of a nonmetallic wedge ring that bears on the piston liner with pressure-induced frictional forces.

Other objects, features, and advantages of the invention will be apparent from the drawings, specification and claims.

DETAILED DESCRIPTION OF THE PREFERRED EMBODIMENT

Figure 1:
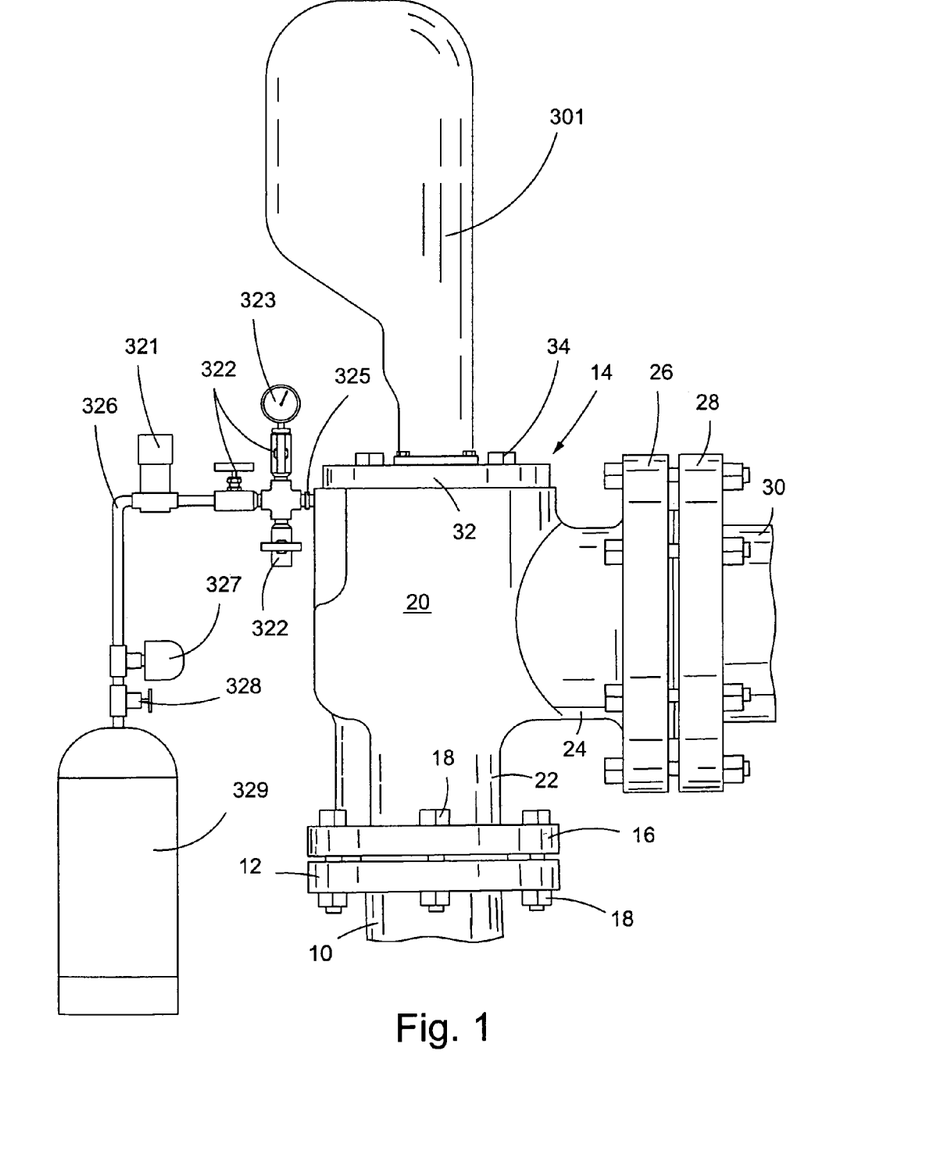
FIG. 1 is a side elevational view of the surge relief valve assembly of the present invention.
Figure 2:
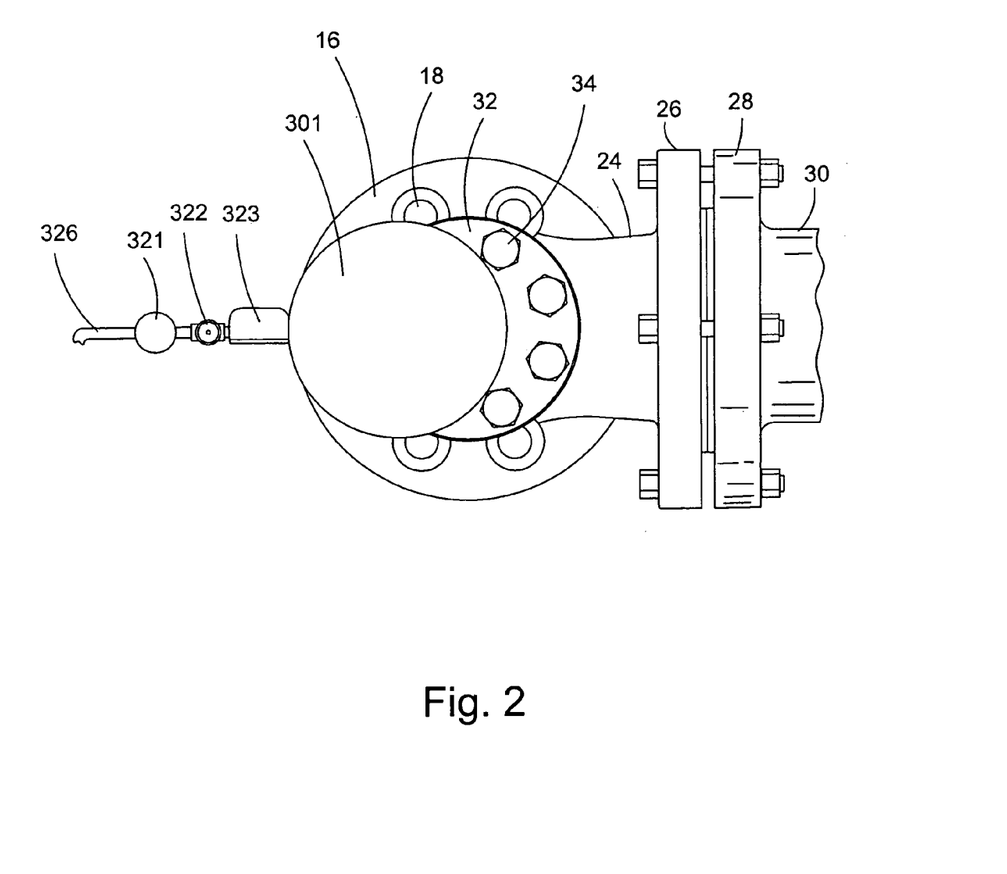
FIG. 2 is a top plan view of the surge relief valve shown in FIG. 1.
Figure 3:
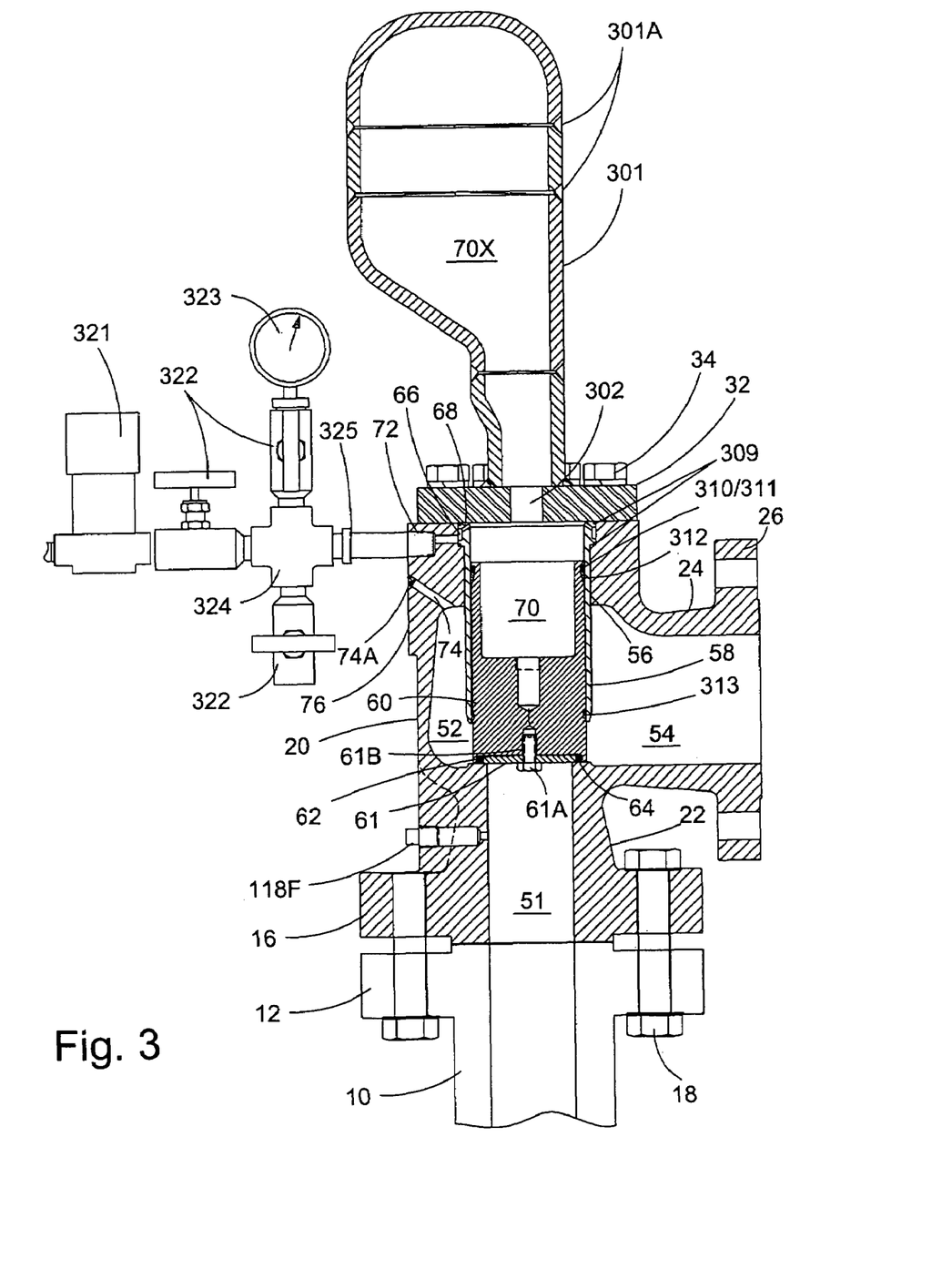
FIG. 3 is an enlarged sectional view of the surge relief valve shown in FIGS. 1 and 2, for illustrating the main relief valve in normal operating condition with the surge relief valve member in a closed position blocking flow from the pressure vessel.

In the description that follows, the terms "upwardly" and "downwardly" are relative, and refer to the perspective on a viewer facing the invention illustrated in FIGS. 1 and 3. Referring now to the drawing for a better understanding of this invention, and more particularly to the embodiment shown in FIGS. 1-3, a surge relief valve assembly 14 is illustrated in a pressure relief system, including a pipeline, vessel, or tank having an inlet generally indicated at 10 with a flange 12 thereon. The surge relief valve assembly has a lower flange 16 connected to upper system flange 12 by suitable bolt and nut combinations shown at 18. The main body 20 of the assembly has an inlet 22 and outlet 24. A threaded port normally used with other applications of this main valve body generally contains plug 118F. Outlet 24 has a flange 26 that can be connected to an outlet flange 28 and pipe 30 in a similar fashion as inlet flange 16. Fluids flow through the valve from inlet area 51 to outlet areas 52 and 54 once the piston 60 is forced by pressure in an upward direction away from nozzle surface 64. Areas 52 and 54 are contiguous, with 52 having a generally annular shape around the circumference of piston 60 and liner 58.

Although the claims of the present invention are not intended to be limited to any certain dimensions, in a preferred embodiment, the flanged valve sizes can be 1×2; 1-½×3; 2×3; 3×4; 4×6; 6×8; 8×10; or 12×16 (all dimensions in inches), for example. In addition to these nominal sizes, the flanged inlet connection 16, 12, and 18, and flanged outlet 26 can be replaced by American National Standard Taper Pipe Threads (NPT) by using a main valve body 20 with an alternate machining configuration at inlet 22 and outlet 24. Such NPT connections do not require bolting 18, but rather screw together tightly with the use of wrenches, and are made leak-tight through the use of an appropriate sealing compound applied to the threads.

At the top of main valve body 20, bolts 34 having an appropriate material specification for pressure-containing service, secure cap 32. The tightened cap holds cylindrical liner 58 in position within the matching bore 56 that is machined into body 20. Elastomeric O-rings 309 provide leak-tight seals between the interfacing metallic surfaces of body 20, liner 58, and cap 32. Within the bore of liner 58 lies piston 60, which slides freely up and down between nozzle surface 64 and the underside of cap 32. To prevent metal-to-metal contact and possible scoring between piston 60 and liner 58, wedge ring 312 and wear ring 313 are fit into shallow grooves in the piston that allow the outboard surface of each ring, and not the outside surface of the piston, to slide against the liner bore as the piston moves up and down. Items 312 and 313 are made of graphite-filled PTFE (polytetrafluoroethylene).

Attached to the top of cap 32, generally by a suitable welding process, is dome reservoir 301. This dome reservoir provides a dome volume 70X that is supplemental to dome region 70 contained within the main valve body and cap envelope. The internal volume of reservoir 301 will vary depending on the nominal size of assembly 14. Fluid transfer between dome volumes 70 and 70X is made possible by port 302 in main valve cap 32. Parts of dome reservoir 301 are fabricated from piping components or other suitable parts of a sufficient thickness to withstand the design pressure of the reservoir. Parts of the reservoir assembly are generally assembled using an appropriate welding process, with typical final welds shown as 301A.

Piston seal 310, an elastomeric O-ring, provides the pressure- and leak-tight seal between piston 60 and liner 58. A PTFE back-up ring 311 is designed to give the O-ring support and prevent excessive deflection of the O-ring into the gap between metal parts 58 and 60.

In addition to its sliding surface contact with the bore of liner 58, wedge ring 312 also provides a dampening function to help ensure smooth piston movement. As pressurized fluid in dome region 70 exerts a downward force on piston seal 310 and back-up ring 311, items 310 and 311 in turn exert this downward force on wedge ring 312. The generally triangular cross-section of the wedge ring and its matching recess within piston 60 causes an increased frictional force of the ring against the bore of liner 58 during piston travel. This increased friction induces drag on the movement of the piston and reduces the likelihood of rapid piston movements or oscillations.

At the bottom of piston 60 as shown, the main elastomeric O-ring seat 62 is secured in place by retaining plate 61. The latter plate is held in place by bolt 61A, which is tightened into a threaded hole in the piston. A locking thread insert 61B within the threaded hole in piston 60 provides resistance to vibration and loosening torque in order to keep bolt 61A secure and tight. Leak-tight closure of piston 60 is provided by the interference fit (squeeze) between seat 62 and metallic nozzle surface 64, the latter having a raised portion to directly impinge on the seat. Nozzle surface 64 is composed of stainless steel, either through application of a corrosion-resistant weld overlay to the surface of the casting if the casting is made of carbon steel, or by virtue of it having been machined directly into the casting material if a stainless steel casting is used.

Main valve body 20 has an outer planar mounting face 76 through which dome port 72 extends. Port 74 may also exist in the body, if machining has already been performed to prepare body 20 for use in a pilot-operated pressure relief valve application. If this is the case, plug weld 74A will be added by an appropriate manual welding process to render port 74 inoperative. In order to allow the appropriate fluid to be routed into dome region 70 from dome port 72, the top of liner 58 is machined with an annular space 66 and series of small radial ports 68.

The outer portion of dome port 72, on the left in FIG. 3 as shown, is machined with an appropriate thread, such as NPT, to allow connection of an appropriate dome gas supply, control components, and fittings. A typical dome gas supply configuration is shown in FIGS. 1, 2, and 3 as follows: precision gas regulator 321, manual valves 322, pressure gage 323, threaded cross 324, male hex nipple 325, tubing 326, roughing regulator 327, manual block valve 328, and gas storage cylinder 329. Gas regulator 321 may be located by the end user of the surge relief assembly according to their configuration of gas supply tanks or other gas source. Gas supply will generally be provided by the end user.

Figure 6:
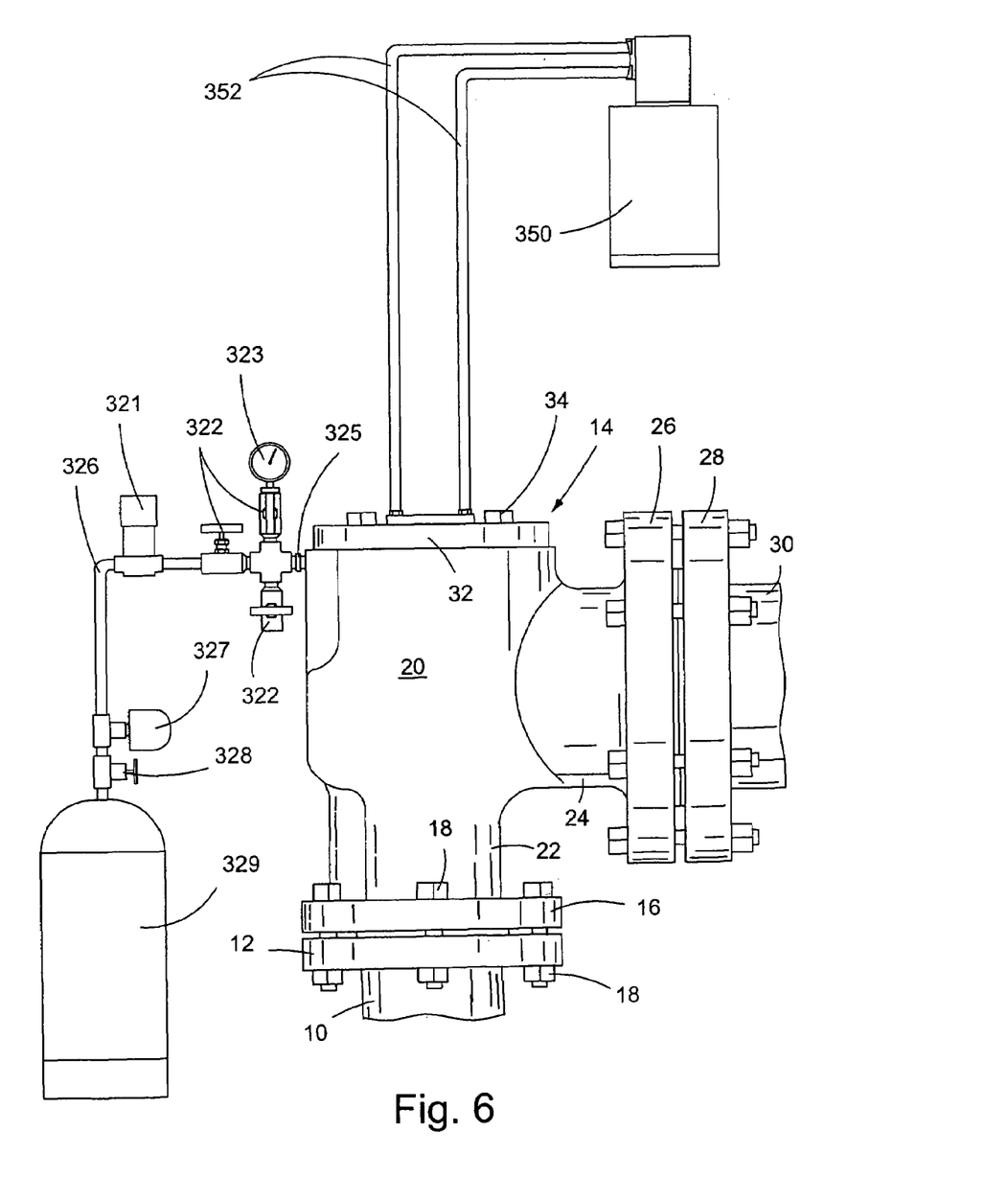

In an alternative embodiment, shown in FIG. 6, reservoir 301 is removed and replaced by external reservoir piping 352 and external reservoir 350. In this embodiment, port 302 is configured to accept one end of external reservoir piping 352 and external reservoir 350 is provided with a port to accept the other end of external reservoir piping 352. External reservoir piping 352 provides fluid communication between volume 70 and the internal volume of external reservoir 350. The external reservoir piping can be of any type known in the art, as configured for the parameters of the pressure relief system.

OPERATION

A set, or trigger, pressure is specified by the user of the surge relief valve assembly according to the operational parameters of their pipeline system, vessel, or tank. The value chosen corresponds to the point at which excess system pressure must be relieved, and is frequently the maximum allowable working pressure as defined by the governing piping or vessel design code.

Figure 4:
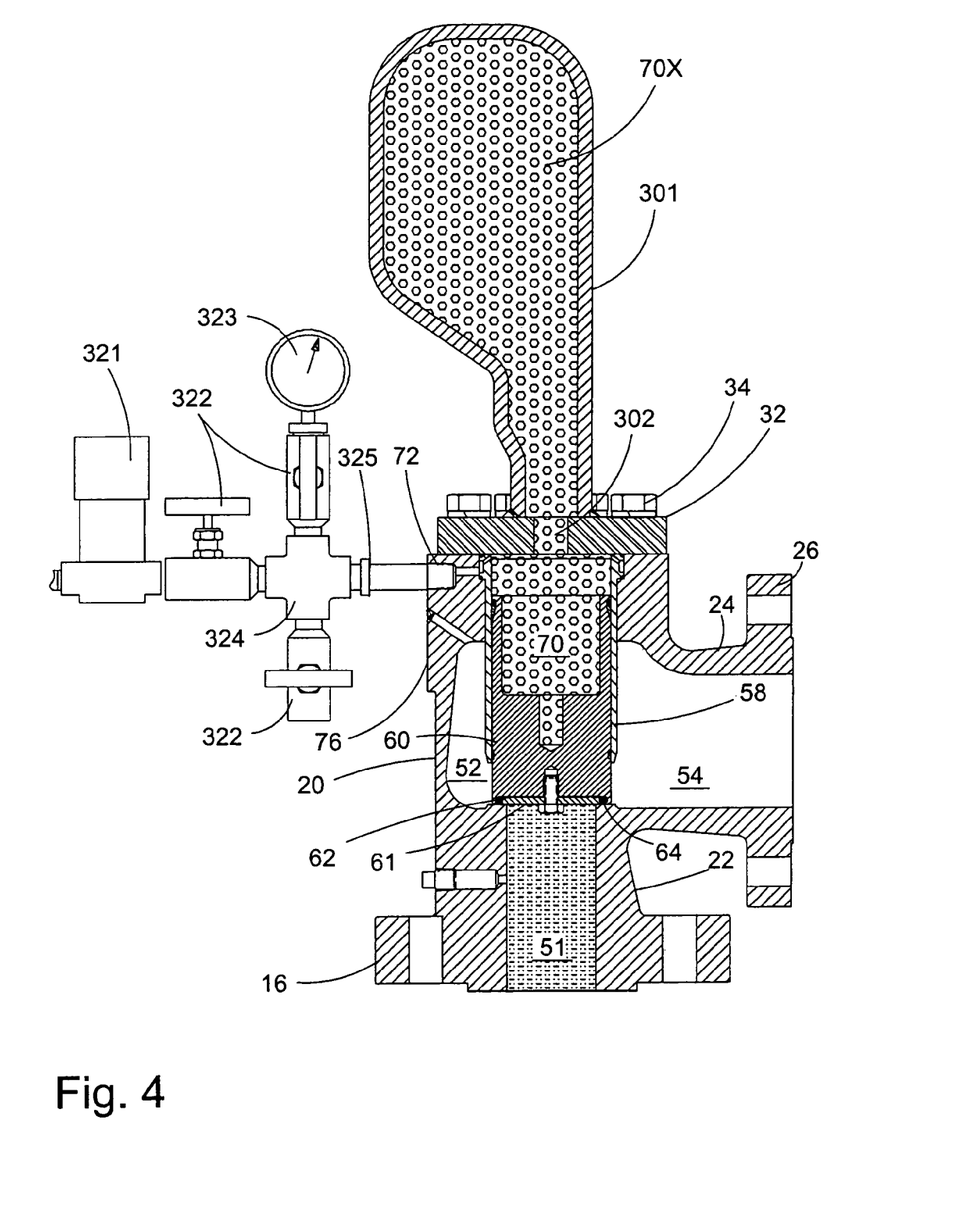
FIG. 4 shows the surge relief valve assembly of FIG. 3 in a closed position.
Figure 5:
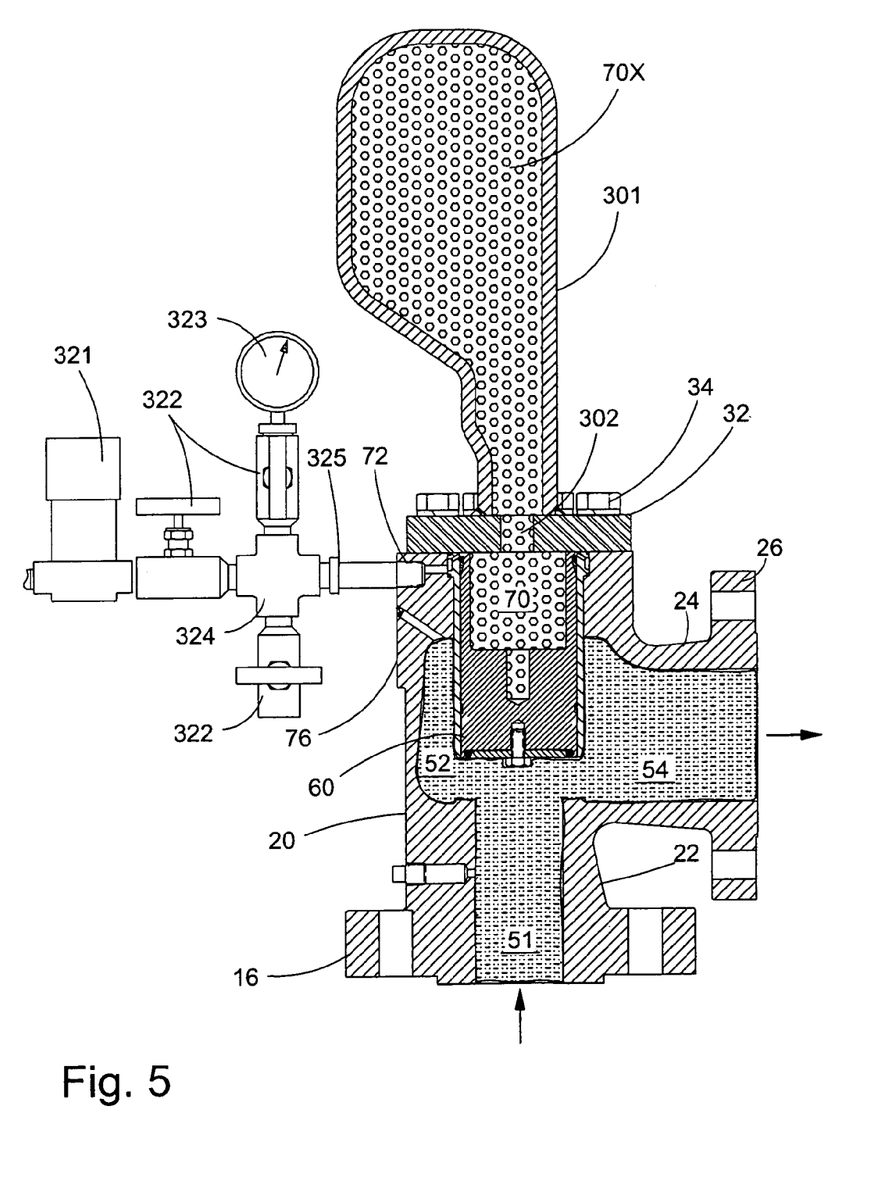
FIG. 5 shows the surge relief valve assembly of FIG. 3 in an open position; and, FIG. 6 is a side elevational view of an alternative embodiment of the surge relief valve assembly of the present invention with an external reservoir.

FIG. 4 shows the surge relief valve assembly of FIG. 3 in a closed position. FIG. 5 shows the surge relief valve assembly of FIG. 3 in an open position. The set pressure of the surge relief valve assembly is set and maintained by charging dome volumes 70 and 70X with a predetermined pressure of a gas such as nitrogen or air. With the main valve closed, as shown in FIG. 4, the dome gas is trapped within a fixed leak-tight volume. At all times, dome gas is completely separate and independent from the process fluid present at the valve inlet 51. Depending on the specific operating environment, temperature compensation may be necessary to maintain constant dome pressure, as pressures of fixed gas volumes rise with increasing temperature and fall with decreasing temperatures. In some aspects, a self-relieving type of regulator 321 is used for temperature compensation. Regulator 321 bleeds off any pressure increase that develops in dome regions 70 and 70X due to increased ambient temperature. In some aspects, temperature compensation involves the use of a buried tank or plenum which, by virtue of its isolation underground, will not be susceptible to internal pressure increases as a result of ambient temperature variations.

The value of dome gas pressure that corresponds to a specified set pressure is a function of the ratio of main valve seat or nozzle area to piston seal area for the valve size in question. Each surge relief valve size has a characteristic area ratio, which can be calculated directly from the machining dimensions of nozzle surface 64 and liner 58. For example, in a 3" by 4" main valve with a nozzle diameter of 3.05 inches and liner inside diameter of 3.50 inches, the seat-to-seal area ratio equals 0.76; for a specified valve set pressure of 500 pounds per square inch (psi), the corresponding dome gas pressure would equal (0.76)×(500) or 380 psi. Establishment of correct dome pressure will, as set pressure is reached, result in zero net force acting on the piston when considering the dome gas acting downward on the piston and system fluid acting in an upward direction.

In FIG. 4, the force generated by the dome gas, hereafter referred to as the dome force, on piston 60 is greater than the force generated by the process fluid, hereafter referred to as the process force, on retaining plate 61. For example, the dome force is proportional to the pressure of the process fluid on retaining plate 61 and the area of retaining plate 61. Thus, piston 60 is pushed downward, toward inlet 51 and seat 62 seals against nozzle 64. As the process fluid pressure reaches and then slightly exceeds the set pressure, the piston 60 is moved in an upward direction, away from said inlet, moving seat 62 off of nozzle 64, as shown in FIG. 5. As seat 62 moves, the process fluid begins to flow up through inlet passage 51 to outlet 54, reducing the pressure of the process fluid and relieving excess system pressure. Piston travel is allowed to begin essentially instantaneously, dependent solely on the balance of the forces exerted by the dome gas and the process fluid on the piston at any instant. That is, piston travel, and hence fluid communication, or fluid flow, between the inlet passage 51 and outlet passage 54, is responsive to the differential between the dome force and the process force. The fluid communication between the inlet passage 51 and outlet passage 54 is proportional to the differential between the dome force and the process force and can change incrementally in response to incremental changes in the force differential.

As shown in FIG. 5, piston 60 continues its travel upward as the force generated by the process fluid on retaining plate 61 continues to rise. As piston 60 moves upward, the volume encompassed by regions 70 and 70X decreases. Consequently, the dome gas is compressed to a higher pressure. The internal volume for dome reservoir 301 is selected so that the allowable rise in dome gas pressure from a closed main piston 60 (FIG. 4) to fully open piston (FIG. 5) is generally 5 to 7%, but may vary depending on specific applications. The selection of the internal volume for dome reservoir 301 is determined through a combination of calculations to determine inlet 51 size required for process fluid flow and actual test data on prototype valve assemblies.

As the process force abates, the compressed dome gas forces piston 60 downward. As the piston moves downward, wedge ring 312 provides a dampening function to help ensure smooth piston movement and reduce the likelihood of rapid piston movements or oscillations. When the dome force is equal to the process force, piston 60 closes and seat 62 seals tightly against nozzle 64.

Thus, it is seen that the objects of the invention are efficiently obtained. While a preferred embodiment of the present invention has been illustrated in detail, modifications and adaptations of the preferred embodiment may be readily apparent to those having ordinary skill in the art. It is to be understood that such modifications and adaptations are considered to be within the scope and spirit of the present invention as set forth in the following claims.

What is claimed is:

1. A surge relief valve comprising:
    a main valve body comprising a dome port and an inlet port, wherein said inlet port is in fluid communication with a first fluid;
    a springless dome reservoir connected to said main valve body via said dome port and arranged to hold a second fluid, said dome reservoir external to said main valve body;
    a piston located in said main valve body, wherein said piston is in fluid communication with said reservoir; and,
    a dampening ring positioned circumferentially about said piston and operatively arranged to dampen movement of said piston;
    wherein said first fluid exerts an upward force on said piston, said second fluid exerts a downward force on said piston, and said piston is arranged to move in response to a differential in said upward and downward forces, wherein said first and second fluids are isolated from one another; and,
    wherein said springless dome reservoir lacks a piston; and,
    wherein said downward force is created solely by compression of said second fluid within said springless dome reservoir.

2. The surge relief valve as recited in claim 1 wherein said main valve body further comprises an outlet port, wherein said piston is arranged to control fluid communication between said inlet port and said outlet port.

3. The surge relief valve as recited in claim 2 wherein said outlet port is substantially perpendicular to said inlet port.

4. The surge relief valve as recited in claim 2 wherein said piston is arranged to provide fluid isolation between said inlet and outlet ports when said downward force is greater than said upward force and to enable fluid communication between said inlet and outlet ports when said upward force is greater than said downward force.

5. The surge relief valve as recited in claim 4 wherein a degree of fluid communication between said inlet and outlet ports is proportional to said differential in said upward and downward forces.

6. The surge relief valve as recited in claim 1 wherein said second fluid is at a specified pressure; and, said surge relief valve further comprises a self-relieving regulator connected to said main valve body and in fluid communication with said piston volume, wherein said self-relieving regulator is arranged to control said second fluid specified pressure.

7. The surge relief valve as recited in claim 6 wherein said self-relieving regulator is arranged to maintain said second fluid specified pressure at a predetermined value in response to changes in an ambient temperature.

8. The surge relief valve as recited in claim 1 wherein said first fluid is a liquid.

9. The surge relief valve as recited in claim 8 wherein said liquid is oil.

10. The surge relief valve as recited in claim 9 wherein said oil is petroleum oil.

11. The surge relief valve as recited in claim 1 wherein said second fluid is a gas.

12. The surge relief valve as recited in claim 11 wherein said gas is selected from the group consisting of nitrogen and air.

13. The surge relief valve as recited in claim 1 wherein said dome reservoir further comprises a first reservoir port and said dome reservoir is mounted directly to said main valve body with said first reservoir port in substantial alignment with said dome port.

14. The surge relief valve as recited in claim 1 further comprising:
    a piping arrangement with a first end connected to said dome reservoir and a second end connected to said dome port and arranged to provide said fluid communication between said dome reservoir and said piston.

15. The surge relief valve as recited in claim 14 wherein said reservoir dome is mounted to said main valve body.

16. The surge relief valve as recited in claim 14 wherein said reservoir dome is remote from said main valve body.

17. The surge relief valve as recited in claim 1 wherein said dampening ring is recessed into said piston.

18. The surge relief valve as recited in claim 1 wherein said dampening ring is a wedge ring having a wedge-shaped cross section.

19. The surge relief valve as recited in claim 1 wherein said dampening ring is made of graphite filled polytetrafluoroethylene.

20. A method for relieving pressure in a fluid-containing space comprising:
    exerting an upward force on a piston in a relief valve connected to a fluid-containing space, wherein said upward force is generated by a first fluid in said fluid-containing space;
    exerting a downward force on said piston, wherein said downward force is generated solely by a second fluid in a dome reservoir connected to said relief valve, and wherein said dome reservoir lacks a piston and is springless and external to a main valve body of said relief valve;
    moving said piston in response to a differential between said upward and downward forces; and,
    dampening movement of said piston by means of a dampening ring positioned circumferentially about said piston.

21. The method as recited in claim 20 wherein moving said piston further comprises controlling a release of said first fluid from said fluid-containing space.

22. The method as recited in claim 21 wherein said relief valve comprises an inlet connected to said fluid-containing space and an outlet substantially perpendicular to said inlet; and,
    wherein controlling a release of said first fluid from said fluid-containing space further comprises controlling a release of said first liquid through said inlet to said outlet.

23. The method as recited in claim 21 wherein controlling a release of said first fluid further comprises preventing said release when said downward force is greater than said upward force and enabling said release when said upward force is greater than said downward force.

24. The method as recited in claim 23 wherein enabling said release further comprises enabling an amount of said release proportional to said differential in said upward and downward forces.

25. The method as recited in claim 20 wherein said second fluid is at a specified pressure; and,
    said method further comprises controlling said specified pressure.

26. The method as recited in claim 25 wherein controlling said specified pressure further comprises maintaining said specified pressure at a predetermined value in response to changes in an ambient temperature proximate said relief valve.

27. The method of relieving pressure in a fluid-containing space as recited in claim 25 wherein said specified pressure is a function of the ratio of the nozzle area to piston seal area of said relief valve.

* * * * *